US009782913B2

(12) United States Patent
Cangiano et al.

(10) Patent No.: US 9,782,913 B2
(45) Date of Patent: Oct. 10, 2017

(54) METHOD FOR MANUFACTURING PANELS HAVING TRANSLUCENT ELEMENTS

(71) Applicant: ITALCEMENTI S.P.A., Bergamo (IT)

(72) Inventors: Stefano Cangiano, Torre de Roveri (IT); Aronne Carminati, Medolago (IT)

(73) Assignee: ITALCEMENTI S.P.A., Bergamo (IT)

( * ) Notice: Subject to any disclaimer, the term of this patent is extended or adjusted under 35 U.S.C. 154(b) by 33 days.

(21) Appl. No.: 14/891,141

(22) PCT Filed: May 14, 2014

(86) PCT No.: PCT/EP2014/059842
§ 371 (c)(1),
(2) Date: Nov. 13, 2015

(87) PCT Pub. No.: WO2014/184242
PCT Pub. Date: Nov. 20, 2014

(65) Prior Publication Data
US 2016/0185016 A1 Jun. 30, 2016

(30) Foreign Application Priority Data
May 14, 2013 (IT) .............................. MI2013A0790

(51) Int. Cl.
B28B 23/00 (2006.01)
B28B 1/14 (2006.01)
(Continued)

(52) U.S. Cl.
CPC ............ *B28B 23/0037* (2013.01); *B28B 1/14* (2013.01); *B28B 11/14* (2013.01);
(Continued)

(58) Field of Classification Search
CPC ... B28B 23/0037; B28B 23/0056; B28B 1/14; B28B 11/14
See application file for complete search history.

(56) References Cited

U.S. PATENT DOCUMENTS 3,091,899 A 6/1963 Bordlein
2007/0074484 A1 4/2007 Yin

FOREIGN PATENT DOCUMENTS

ES 2330492 12/2009
JP 10292598 A * 11/1998
(Continued)

OTHER PUBLICATIONS

Shizuo et al. (JPH10-292598); (Nov. 1998). [JPP—Machine Translation to English].*
(Continued)

*Primary Examiner* — Benjamin Schiffman
(74) *Attorney, Agent, or Firm* — Abelman, Frayne & Schwab

(57) ABSTRACT

The present invention relates to a method for manufacturing prism-shaped panels (1), each comprising through portions (55) made of translucent material adapted to transmit light between two opposite sides of the panel. The method includes arranging a plurality of elements (5, 5', 5") made of translucent material in a formwork so that the main direction of development (500) of such elements is parallel to the vertical direction of development (203) of the formwork. The method includes pouring cementitious mortar into said formwork (4) so that said cementitious mortar is distributed between said elements and so as to generate, after the hardening of said cementitious mortar, a substantially prism-shaped semi-finished cementitious mortar product (2) in which said elements made of translucent material are incorporated. The method further includes extracting the semi-finished product from said formwork after the harden-
(Continued)

ing of the cementitious mortar, and cutting the semi-finished product according to cutting planes orthogonal to the longitudinal direction (500) in which the elements incorporated in said semi-finished product develop, so as to obtain prism-shaped parts, each of which corresponds to one of said panels (1).

17 Claims, 10 Drawing Sheets

(51) Int. Cl.
*B28B 11/14* (2006.01)
*E04C 2/54* (2006.01)
*B29C 39/10* (2006.01)
*E04C 2/04* (2006.01)
*B29K 33/00* (2006.01)
*B29L 7/00* (2006.01)

(52) U.S. Cl.
CPC .......... *B28B 23/0056* (2013.01); *B29C 39/10* (2013.01); *E04C 2/044* (2013.01); *E04C 2/54* (2013.01); *B29K 2033/12* (2013.01); *B29L 2007/002* (2013.01)

(56) References Cited

FOREIGN PATENT DOCUMENTS

| | | |
|---|---|---|
| JP | H10292598 | 11/1998 |
| JP | 2008214961 | 9/2008 |
| WO | 2006/070214 | 7/2006 |
| WO | 2010/066831 | 6/2010 |

OTHER PUBLICATIONS

International Search Report and Written Opinion dated Jul. 17, 2014 for corresponding PCT patent application No. PCT/EP2014/059842.

\* cited by examiner

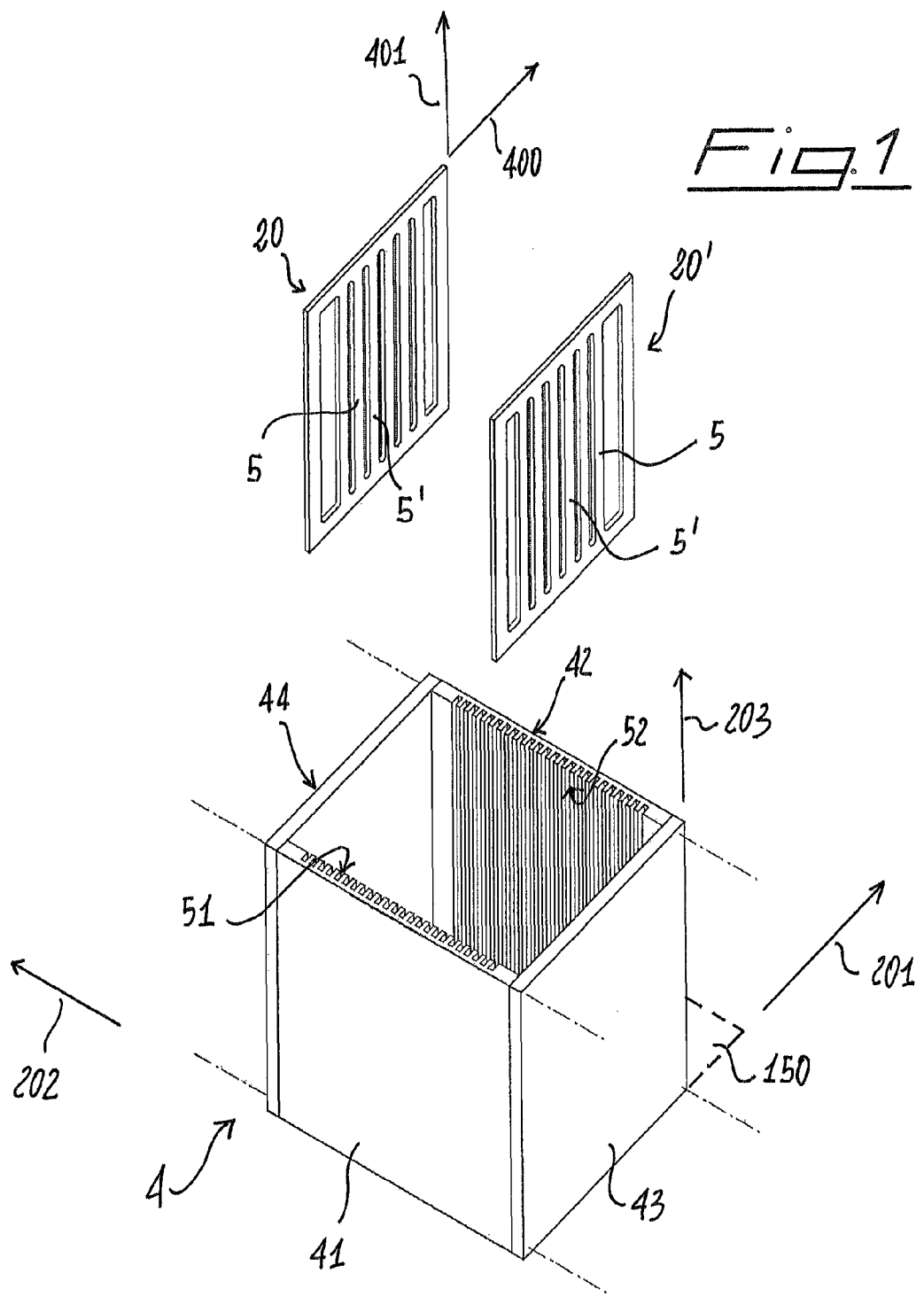

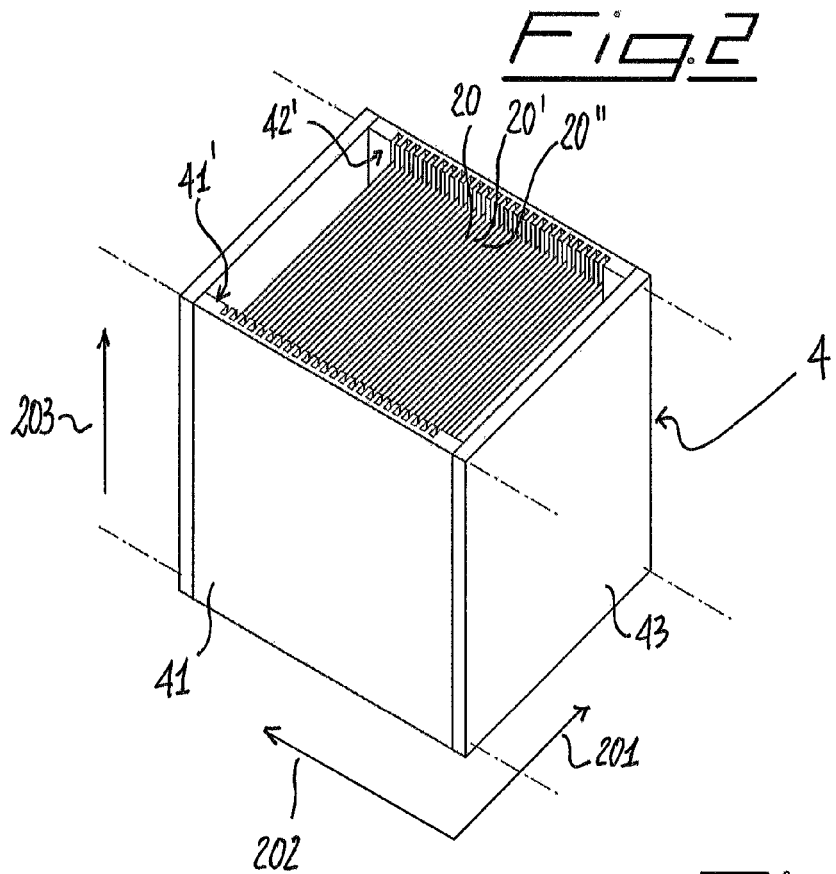
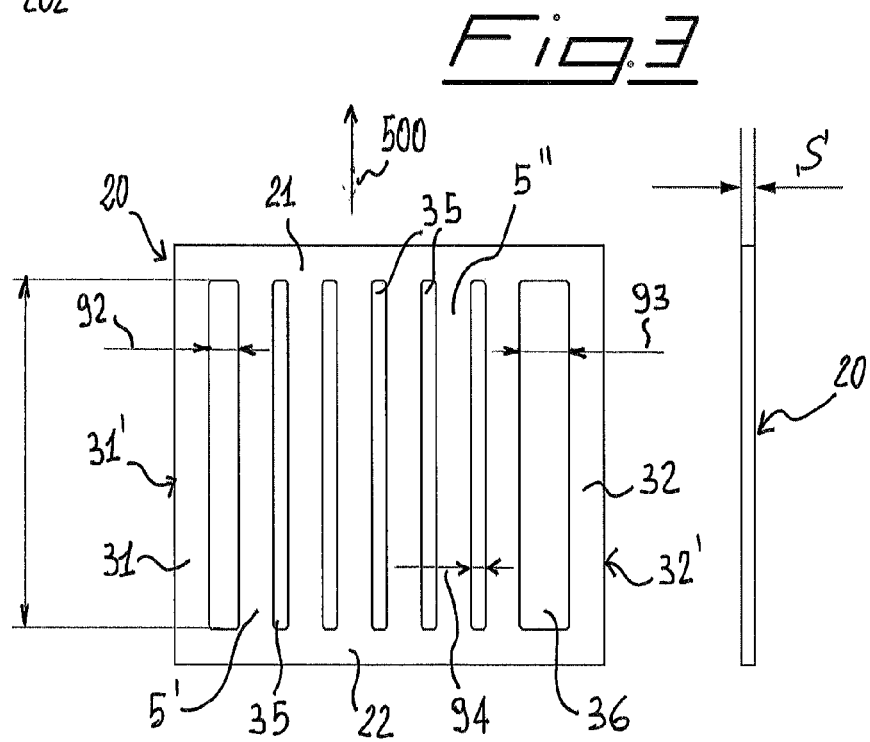

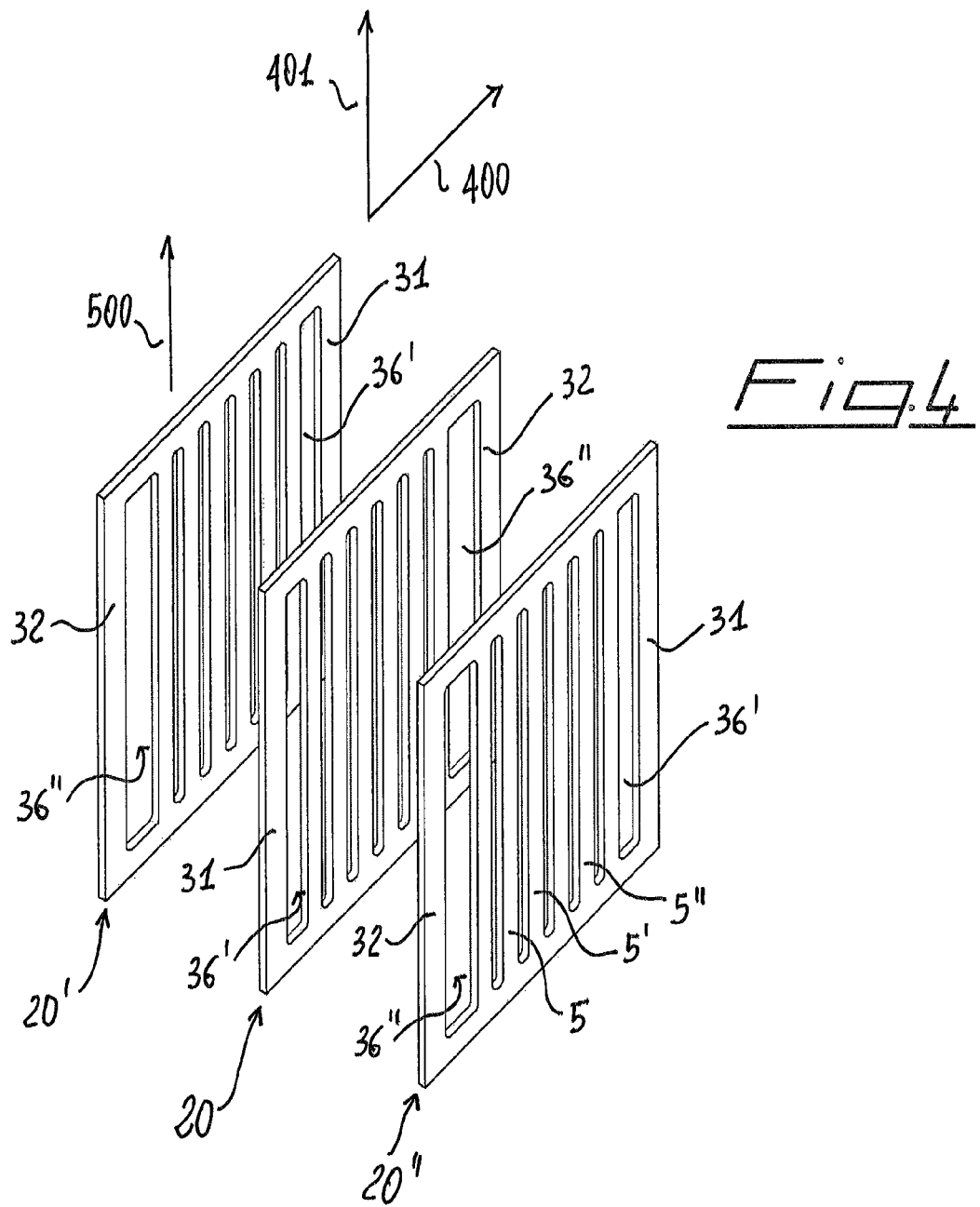

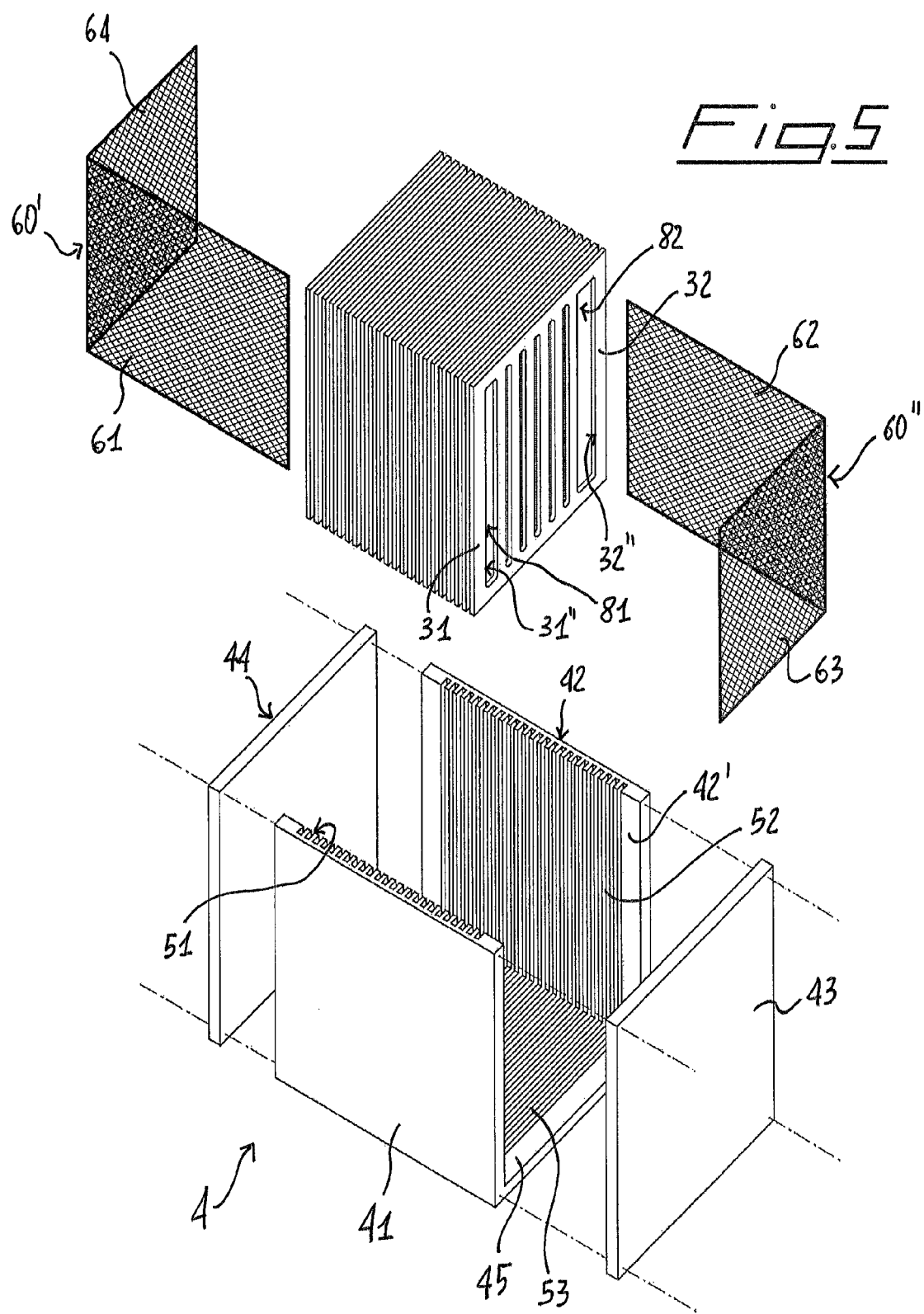

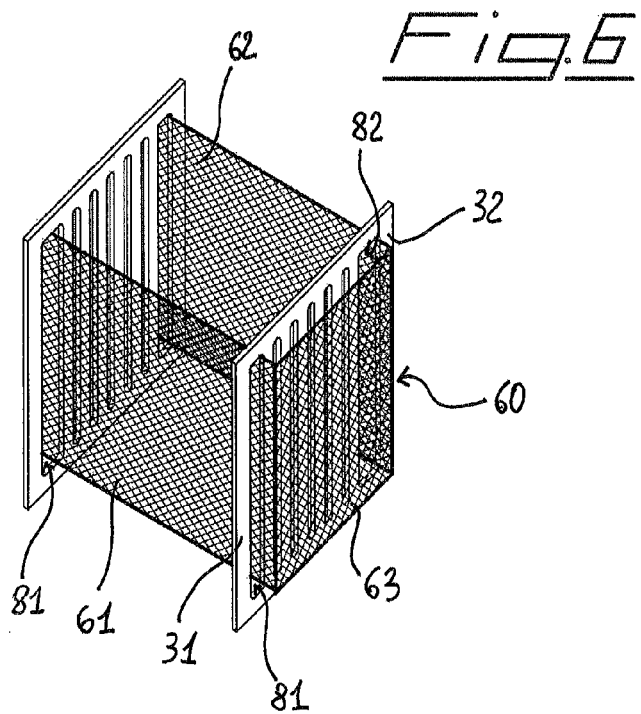
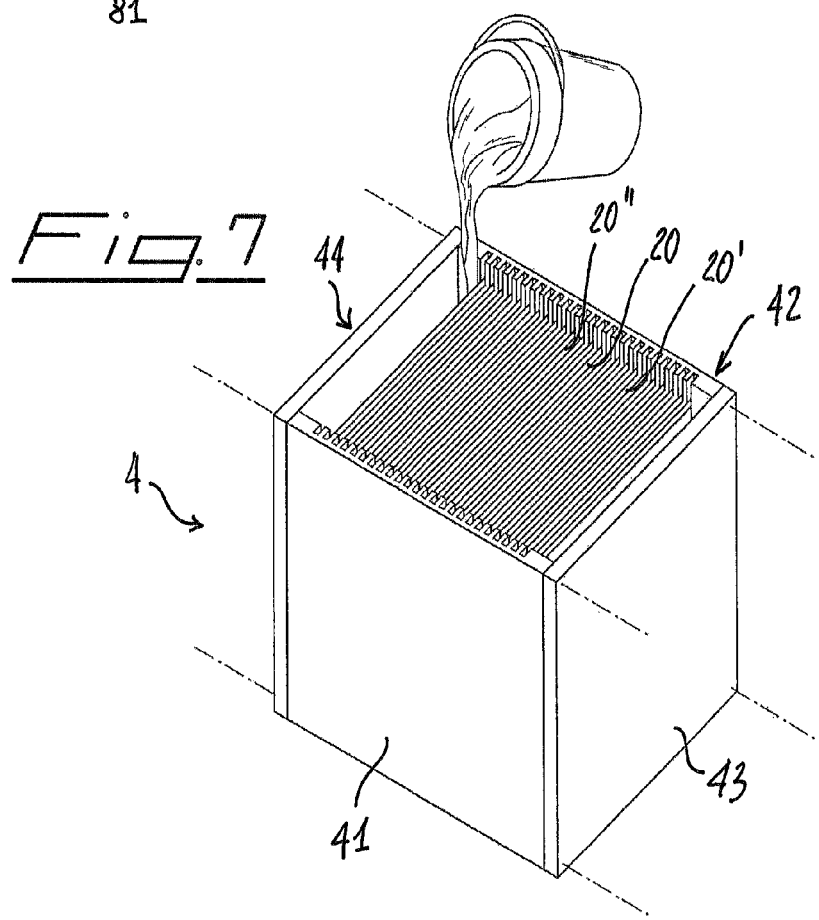

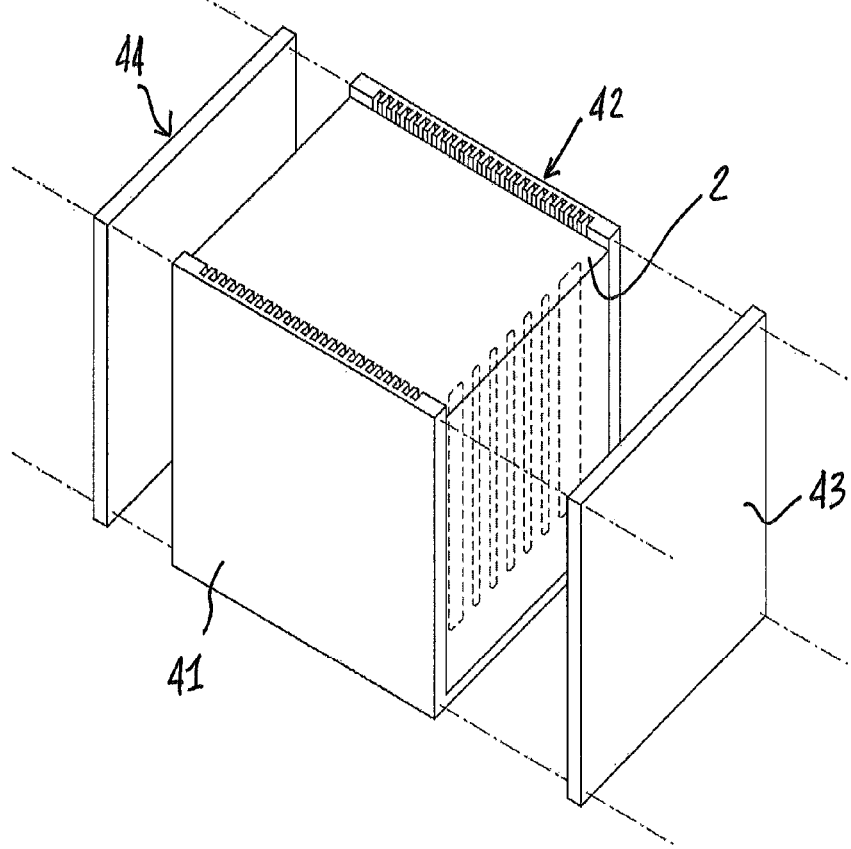
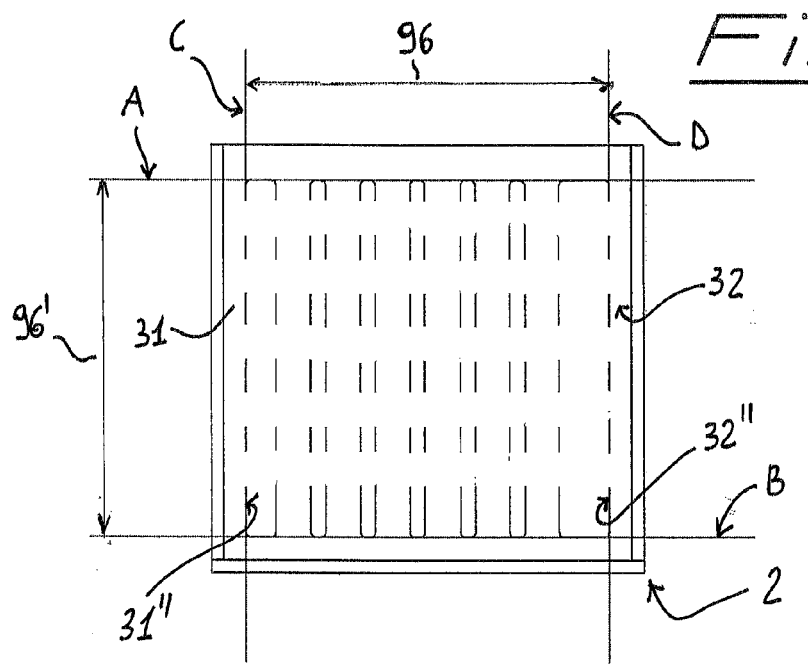

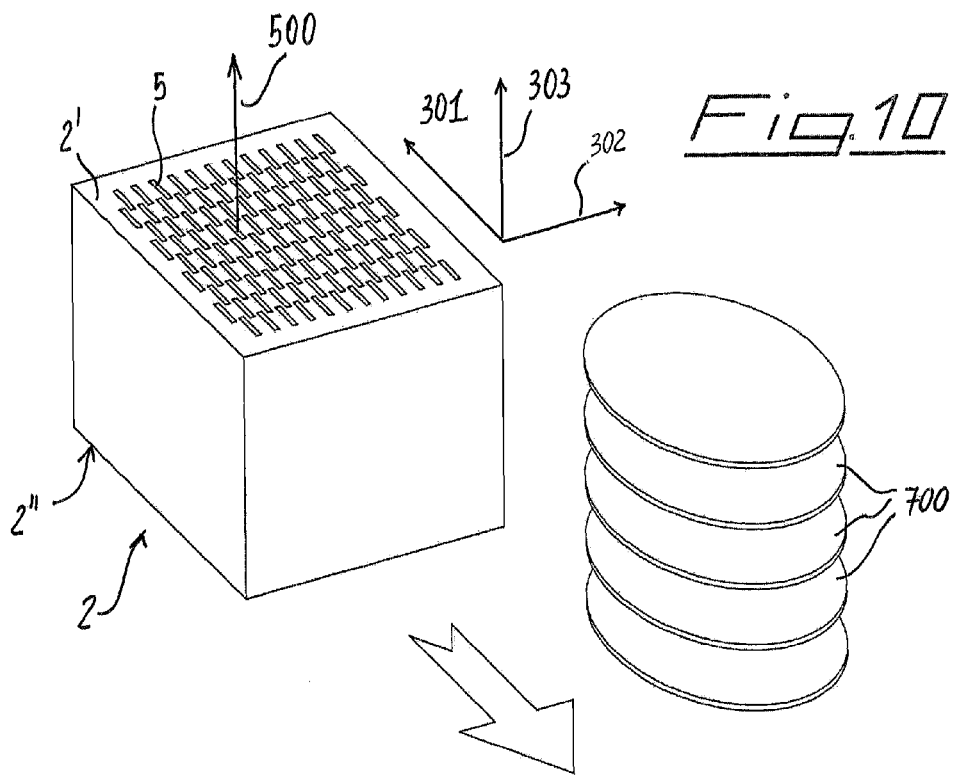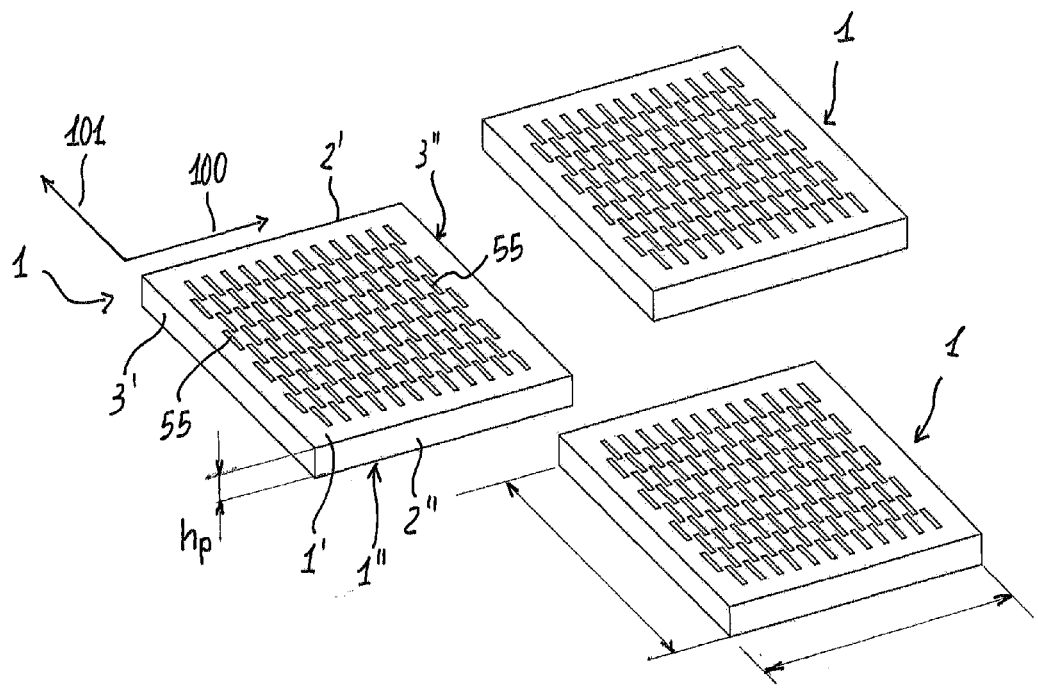

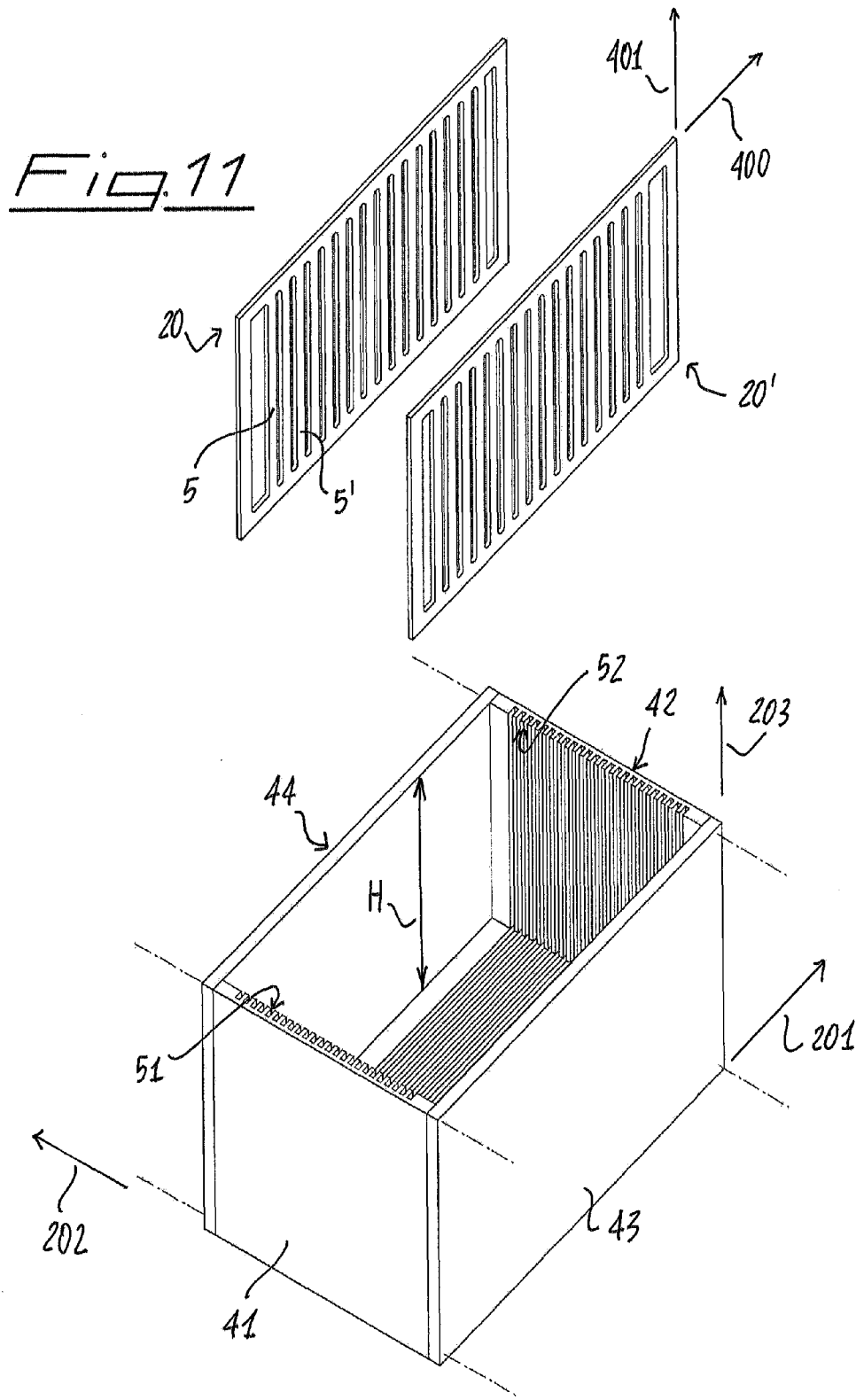

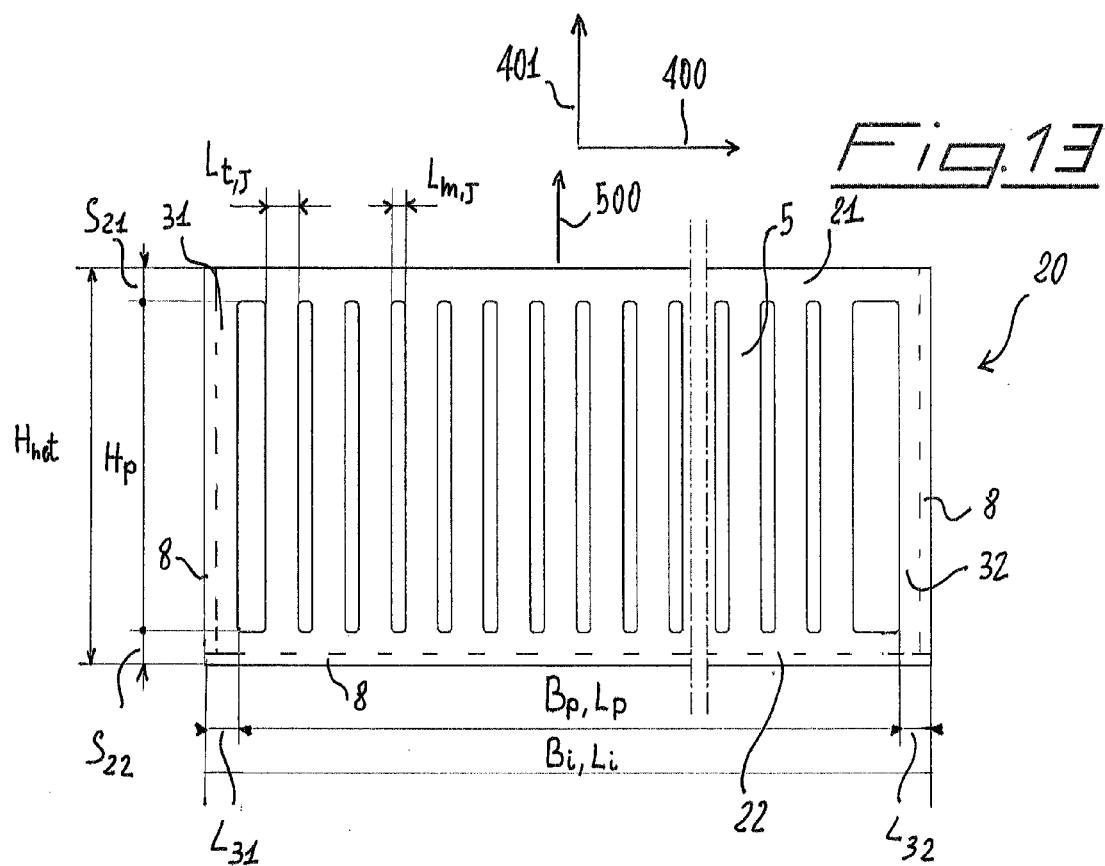

METHOD FOR MANUFACTURING PANELS HAVING TRANSLUCENT ELEMENTS

CROSS REFERENCE TO RELATED APPLICATIONS

This application is a national phase of PCT application No. PCT/EP2014/059842, filed May 14, 2014, which claims priority to IT patent application No. MI2013A000790, filed May 14, 2013, all of which are incorporated herein by reference thereto.

FIELD OF THE INVENTION

The present invention relates to the production of cementitious mortar products with properties of transparency to the light. In particular, the present invention relates to a method for manufacturing prism-shaped panels comprising a plurality of translucent portions passing through the panel to transmit light between two opposite sides of the panel.

BACKGROUND ART

In the field of constructions is known the use of cementitious mortar products with properties of transparency to light. According to a first known embodiment (described, for example, in patent application WO03097954), such cementitious mortar products are made in the form of cementitious mortar blocks internally crossed by optical fibers which permit the transmission of light from one side to the other of the block itself. In particular, the optical fibers are located as a warp in meshes or special fabrics, and are thus inserted in cementitious mortar poured into formworks to provide blocks of variable dimensions in relation to their end use. Plates or panels, which are finally subjected to smoothing and polishing, are thus obtained from such blocks.

Only after such operations the above-described transparency effect can be achieved, which is however conditioned by the intensity of the incident light on the block and by the angle of incidence of the same, beyond a given value from which the transparency effect determined by the transport of light by the optical fibers gradually decays, this being an evident limit of such a technique. Another drawback of the above-described solution is found in the complex positioning of the optical fibers, which requires to prepare a particular fabric as a support to be inserted in subsequent layers into the formworks, alternating with layers of cementitious mortar; furthermore, additional steps of cutting and polishing are required in order to obtain plates or panels from the blocks, which steps imply waste of costly material (optical fibers), especially when parts of considerable size are needed, such as square plates longer than one meter per side.

It is equally known that the limits and drawbacks of the aforesaid solution have been overcome by using composite cementitious mortar panels comprising translucent elements which extend through the entire thickness of the panel. In this regard, patent application EP 2376718 describes some embodiments of such composite material in which the translucent elements are made of PMMA. In order to obtain such panels, the PMMA elements are firstly positioned in a formwork and arranged according to parallel lines by taking advantage of appropriate spacers which keep the elements reciprocally spaced apart. The formwork is then filled with cementitious mortar to embed the PMMA elements.

With respect to the solutions requiring the use of optical fibers, the use of the translucent elements described in EP 2376718 has been proven to be much more effective because the transparency effect is however achieved even in the presence of unfavorable light angles.

However, it has been observed that the panels with elements made of PMMA have some drawbacks which require a solution in order to make this technology easily usable. With reference again to the solution described in EP 2376718, the elements made of PMMA are shaped as longitudinal elements characterized by stretches having a thickness equal to that of the panel and connected by stretches of lower height according to a substantially "chain-like" development.

It has been seen that the cost formation of each "chain-like" element is determined by two main components, the first of which is the cost of the material, namely of the rectangle made of PMMA from which the "chain" is obtained. The second component is instead determined by the cost of the laser beam cutting process, which is considered to be the best practice in the prior art.

It has been additionally observed that the production process of the panels includes a substantially crafted, and in particular a manual, arrangement of the chains in the formworks according to a predetermined arrangement which requires particular care and diligence by workers, the simultaneous use of multiple formworks and the cementitious mortar pouring operations which are made rather problematic by the need to fill one mould at a time. It results in that the crafted production process is obviously accompanied by particularly high management costs.

Furthermore, it has been observed that panels in which the chains are arranged in irregular manner having poor parallelism and lacking in rectilinearity are often obtained in the above-described production process. This firstly compromises the good appearance result thereof. Finally, it is worth noting the poor flexibility of the method when productions of panels with different sizes are required because the availability of formworks provided with sides of different lengths and/or heights is required.

A final drawback of the solution described in EP 2376718 is found in the substantial impossibility to use other materials, besides PMMA, for manufacturing the translucent elements. The choice of PMMA was dictated from the beginning by the need to use a material having good translucence features, good resistance to alkali and high tenacity in order to reduce possible rejects/breakages during the step of manufacturing the panels. While satisfying the aforesaid requirements, the PMMA elements have a high water absorption coefficient (about 2-3%) and a thermal expansion coefficient of one order of size higher than that of the cementitious mortar used. These aspects are particularly critical for the structural integrity of the panel. For this reason, in order to reduce the absorption capacity of the PMMA elements (and their consequent swelling due to absorption of water, in particular from the cementitious mortar) a preliminary step of saturating the elements in water for at least 24 hours at a temperature of about 45-50° C. is required. This aspect also significantly impacts on the process. Indeed, this preliminary step, although not particularly demanding, requires the availabily of workers and the use of a tank for storing the elements made of PMMA in hot water. Additionally, it has been seen that in order to reduce the risk of cracking due to thermal incompatibility, high dosages of fibers (preferably stainless steel) are often employed and substances (latexes) capable of attenuating the modulus of elasticity at least on the short term are used in the cementitious mortar mixture. Therefore, the possibility of using materials alternative to PMMA could allow a further reduction of the process costs. In this regard, the use of glass could represent an excellent alternative to PMMA because glass has a better thermal compatibility with cementitious mortar (and a better fire reaction than PMMA), the optical properties being substantially equal. Despite this evidence, it is unthinkable to make the elements described in EP 2376718 of glass due to their particular chain shape which is impossible to obtain. The poor tenacity (i.e. the high fragility) of glass would make positioning the elements in the formwork even more difficult and the subsequent pouring operation could cause the breakage of the elements themselves.

The need to have a new method for the production of the translucent panels which allows to overcome the aforesaid drawbacks and firstly allows to drastically reduce production costs and simultaneously increase end product quality clearly arises from the above. The need to have a new method for the production of such panels which allows to use light radiation transmission elements made of materials alternative to PMMA equally arises.

SUMMARY

It is the main task of the present invention to provide a method for manufacturing composite cementitious mortar-based panels of the type comprising elements made of translucent material which allows to solve the above-mentioned drawbacks. In the scope of this task, it is a first object to provide a production method which drastically allows to reduce production costs. It is another object of the present invention to provide a method which allows to produce panels of different thickness without needing to modify the equipment. It is a further object to provide a method which allows to improve the accuracy of positioning the translucent inserts in order to limit the production rejects as much as possible. It is another object to provide a method which allows to increase the end quality of the obtained panel in terms of surface regularity in order to facilitate the subsequent installation thereof. It is yet another object to provide a method which allows to use translucent elements also made of glass or other material alternative to the PMMA which is normally employed. It is a not last object of the present invention to provide a method which is reliable and easy to be implemented at competitive costs.

This task and these objects are thus achieved by a method for manufacturing composite panels comprising the steps of:
arranging a prism-shaped formwork which is developed along a first horizontal direction, a second horizontal direction orthogonal to the first direction and along a third substantially vertical direction;
arranging a plurality of elements made of translucent material which is developed mainly along a main direction of development;
arranging said elements inside the formwork according to a predetermined arrangement corresponding to that provided for said through portions in said panels; said elements being arranged so that said longitudinal direction of development is parallel to said third, substantially vertical, direction in which said formwork is developed;
pouring cementitious mortar into the formwork so that the cementitious mortar is distributed between the elements made of translucent material and so as to generate, after the hardening of the cementitious mortar, a substantially prism-shaped semi-finished cementitious mortar product in which the elements made of translucent material are incorporated;
extracting the semi-finished product from the formwork after the hardening of the cementitious mortar;
cutting the semi-finished product according to cutting planes orthogonal to the longitudinal direction in which the elements incorporated in the semi-finished product develop so as to obtain prism-shaped parts, each of which corresponds to one of the panels.

From the above, it is apparent that by means of the method according to the invention it is possible to obtain a plurality of panels simply by transversally "cutting" a semi-finished cementitious mortar product preventively obtained by pouring into a mould in which the elements made of translucent material were appropriately arranged. Thus, unlike the prior art, the panels are not obtained by means of single pouring operations but on the contrary are obtained by means of a single pouring operation by means of which the semi-finished product is made and by a subsequent cutting operation by means of which not one but a plurality of panels with through portions inserted between the main sides of the translucent panels can be obtained.

LIST OF FIGURES

Further features and advantages will become apparent from the description of the following non-limitative examples of the semi-finished cementitious mortar product according to the present invention, only shown by way of non-limiting example in the accompanying drawings, in which:

FIG. 1 diagrammatically shows a first possible equipment employed during a first step of the method for manufacturing panels with translucent elements according to the present invention;

FIG. 2 is a view of the equipment in FIG. 1 at the end of said first step of the method according to the present invention;

FIG. 3 is a front view and a side view of a plate made of translucent material used in the embodiment of said first step of the method according to the present invention;

FIG. 4 shows a plurality of plates made of translucent material having a shape equivalent to that of the plate in FIG. 3;

FIG. 5 is an exploded view of the equipment in FIG. 2;

FIG. 6 is a diagrammatic view of a further step of the method according to the present invention;

FIG. 7 is a diagrammatic view of the pouring of cementitious mortar with reference to the equipment in FIG. 2;

FIGS. 8 and 9 are diagrammatic views related to subsequent steps of the method according to the present invention;

FIG. 10 is relates to a further step of the method according to the present invention;

Figure 12:
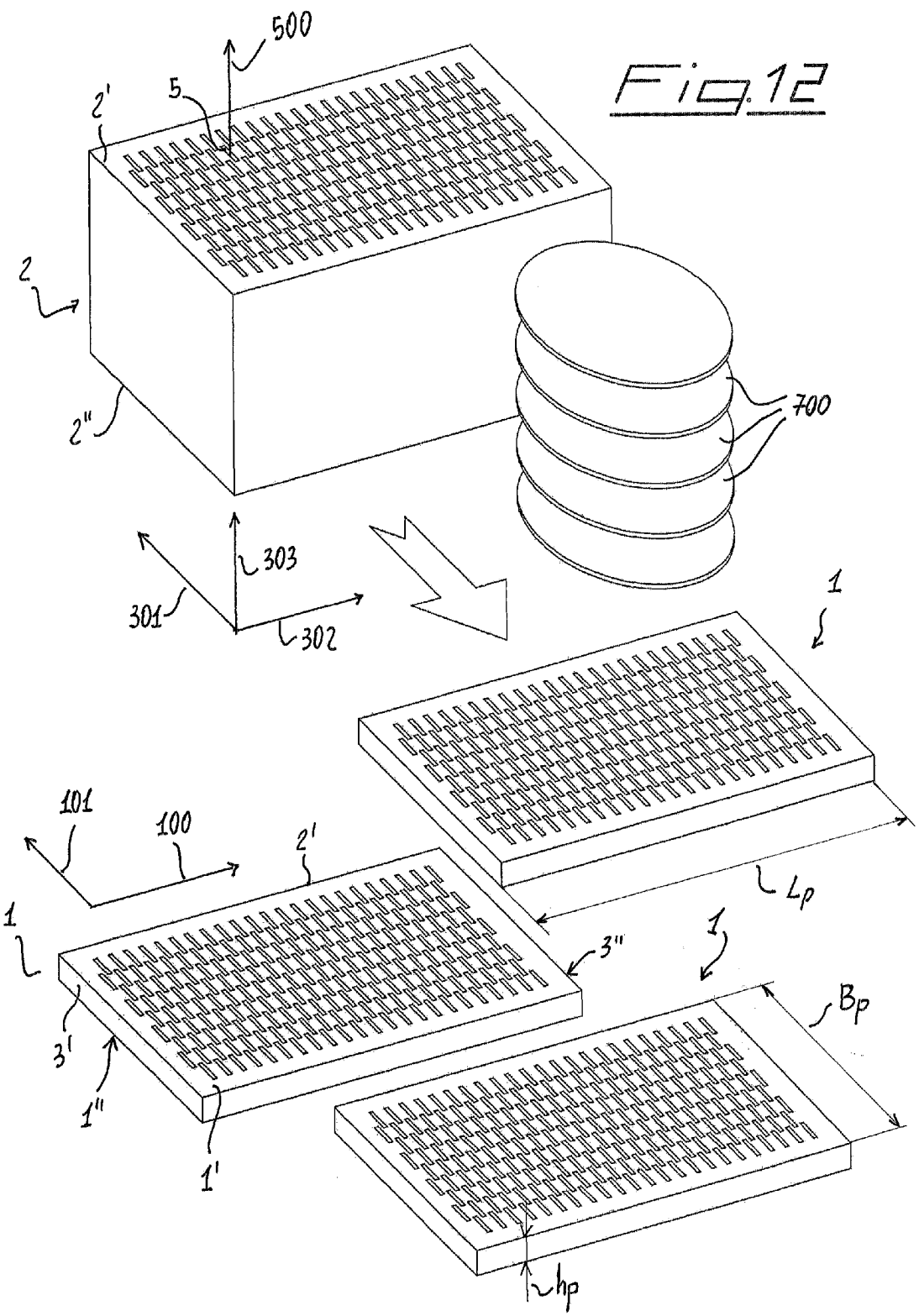

FIG. 11 diagrammatically shows a second possible equipment used during a first step of the method for manufacturing panels with translucent elements according to the present invention;

FIG. 12 relates to a step of the method according to the invention with reference to the equipment shown in FIG. 11;

FIG. 13 is a front view of a plate made of translucent material used with reference to the equipment shown in FIG. 11.

The same reference numbers and letters in the figures refer to the same members or components.

DETAILED DESCRIPTION

The present invention thus relates to a method for manufacturing cementitious mortar-based panels 1. In particular, each panel 1 obtained by means of the method according to the present invention comprises a plurality of through portions 55 made of translucent material which have the function of transmitting light between the two opposite sides 1', 1" of panel 1. With reference to FIGS. 10 and 12, more specifically, for the purposes of the present invention, the expression "panel 1" indicates a prism-shaped cementitious mortar-based body which develops along a first reference direction 100 and along a second reference direction 101 which is substantially orthogonal to the prism 100. Such a body is thus delimited by a pair of main first flat sides 1', 1", a first pair of sides 2',2" which develop parallel to the first direction 100 and a second pair of sides 3',3" which develop parallel to the second reference direction 101. The main sides 1', 1" have a greater extension than the peripheral sides 2', 2", 3', 3". The portions 55 cross panel 1 so as to allow the passage of light between the first flat side 1' and the second flat side 1".

The method according to the invention includes arranging a container 4 (hereinafter also indicated by the expression "formwork 4") for the pouring of cementitious mortar which is prism-shaped and develops according to a first horizontal direction 201, a second horizontal direction 202 orthogonal to the first direction 201 and a third substantially vertical direction 203, i.e. orthogonal to a horizontal reference plane defined by the first direction 201 and by the second direction 202. The third direction 203 is a direction substantially parallel to the pouring direction of the cementitious mortar in formwork 4.

FIGS. 1 and 11 show two possible embodiments of formwork 4 which may be used to implement the method according to the invention. In particular, in the solution in FIG. 1, formwork 4 extends in substantially equivalent manner along the three directions 201, 202, 203 according to a substantially "cubic" configuration. As will be explained in greater detail below, this shape allows to obtain panels 1 the main flat sides 1', 1" of which are substantially "square" as shown in FIG. 10. On the contrary, in the solution shown in FIG. 11, the first direction 201 shows a "main" direction of development of formwork 4, so as to obtain panels 1 in which the main flat sides 1', 1" are substantially rectangular, as shown in FIG. 12. In essence, the final shape of the panels 1 will conform to the transversal section of formwork 4, i.e. a section evaluated with respect to a section plane orthogonal to the above-described third, substantially vertical direction 203. The method according to the invention includes arranging a plurality of longitudinal elements 5, 5', 5" made of translucent material in formwork 4 according to a predetermined arrangement. In this regard, for the purpose of the present invention, the expression "element 5, 5', 5" indicates a substantially two-dimensional body which develops according to a main direction of development 500 having a thickness (evaluated as the distance between the two surfaces of greater extension) is greatly smaller than the other dimensions.

As apparent hereinafter, such elements 5, 5', 5" made of translucent material have the function of defining through portions 55 which cross the panels 1 which will be obtained. For this reason, said transversal section (evaluated according to a plane orthogonal to said main direction of development 500) corresponds, for each obtained panel 1, to the transversal section of the through portions 55, evaluated according to a section plane parallel to the flat sides 1', 1" of the panel itself.

The method according to the invention includes arranging said elements 5, 5', 5" made of material transparent to the light (i.e. translucent material) in formwork 4 according to a predetermined arrangement which corresponds to that provided for the through portions 55 in each said panel 1. Said elements 5, 5', 5" are arranged so that, for each one, said main direction of development 500 is parallel to said third (substantially vertical) direction 203 in which formwork 4 develops.

The method thus includes pouring the cementitious mortar into formwork 4 so that it is distributed between the walls 41, 42, 43, 44, 45 of the same and between the longitudinal elements 5, 5', 5" made of translucent material. The purpose of the pouring is to generate, after the hardening of the cementitious mortar, a substantially prismatic semi-finished cementitious mortar product 2 in which the elements made of translucent material 5, 5', 5" are incorporated.

At the end of the step of hardening, the shape of such a semi-finished product 2 substantially corresponds to that of formwork 4 by means of which it was generated. In FIGS. 10 and 12, the semi-finished product 2 develops according to three directions 301, 302, 303: a first direction of development 301, a second direction of development 302 orthogonal to the first direction 301 and a third direction of development 303 which is substantially orthogonal to a reference plane defined by the first direction 301 and by the second direction of development 302. In particular, for the purposes of the present invention, such a third direction 303 is also indicated by the expression "reference direction 303" and is a direction parallel to the main direction 500 of the elements 5, 5', 5" made of translucent material which are incorporated in the semi-finished product itself. It is further worth noting that the semi-finished product 2 have a transversal section (i.e. a section according to a plane orthogonal to said main direction 500) which corresponds to the transversal section of the above-described formwork 4 in which the semi-finished product 2 was obtained.

Following the hardening of the cementitious mortar, the method according to the invention thus includes extracting such a semi-finished product 2 from formwork 4. For the purposes of the present invention, the word "extracting" generically indicates any action which physically separates the semi-finished product 2 from formwork 4. Therefore, for this purpose, the possible disassembly of formwork 4 must be considered an extraction operation of the semi-finished product 2 from the container itself, as specified in greater detail below.

The method according to the present invention includes sectioning/cutting the semi-finished product 2 according to transversal section planes, i.e. according to planes orthogonal to the reference direction of development 303 of the aforesaid semi-finished product. In this manner, the semi-finished product 2 is divided into two prismatic parts, each of which substantially corresponding to a panel 1. Each prismatic part is crossed by through portions 55 of translucent material obtained by horizontally cutting the elements 5, 5', 5" previously incorporated in the semi-finished product 2 by the cementitious mortar.

FIGS. from 1 to 10 relate to an embodiment of the method according to the invention in which formwork 4 indeed has a substantially "cubic" shape. Such a shape of formwork 4 must only be considered as a possible, and thus not exclusive, embodiment of the formwork itself. Indeed, hereinafter in this description reference will be prevalently made to the method and equipment shown in FIGS. from 1 to 10. However, it is worth noting that similar conditions remain valid also if equipment, and more in general the method, referred to FIGS. from 11 to 13 is used.

In general, a formwork 4 which can be used for the method according to the invention comprises a first containing wall 41, a second containing wall 42 parallel and opposite to the first wall 41, a third containing wall 43 and a fourth containing wall 44 parallel and opposite to the third wall 43. The fourth wall 44 and the third wall 43 are orthogonal to the first wall 41 and to the second wall 42 so as to confer a prismatic shape to the container 4. As apparent in FIG. 1, but also in FIG. 13, the first wall 41 and the second wall 42 develop on plane parallel to the first horizontal direction 201 of formwork 4, while the third wall 43 and the fourth wall 44 develop on planes parallel to the second horizontal direction 202 of the formwork itself.

Formwork 4 is delimited on the bottom by a lower containing wall 45 on which the other aforesaid walls 41, 42, 43, 44 rest. In essence, the lower wall 45 is intended to rest on a resting surface 150. The walls 41, 42, 43, 44 of formwork 4 are reciprocally connected by means of removable connection means, such as screws, for example, so as to allow to disassemble the formwork itself at the end of the hardening of the above-described semi-finished product 2 and its subsequent assembly. It is worth noting that the connection means must be chosen/dimensioned so as to exert an action such to support the thrusts deriving from the cementitious mortar in fresh state. In this regard, the walls 41,42,43,44 of formwork 4 may be preferably reinforced for such a purpose.

According to a preferred embodiment of the method according to the invention, the elements made of translucent material 5, 5', 5" are arranged in distinct groups in formwork 4. In particular, the method includes arranging/positioning such elements 5, 5', 5" in the container 4 by means of a plurality of flat plates 20, 20', 20" with each of which a group of said elements 5, 5', 5" is associated. Each of these plates 20, 20', 20" comprise a peripheral frame which supports the elements 5, 5', 5" which lay on a plane defined by the plate itself. In particular, said elements 5, 5', 5" develop parallel to each other. As specified in greater detail, each plate 20, 20', 20" is arranged inside formwork 4 on a positioning plane which is orthogonal to a pair of reciprocally opposite peripheral walls (e.g. the first wall 41 and the second wall 42) of the formwork itself. In this manner, for each plate 20, 20', 20", the lying plane of the elements 5, 5', 5" is parallel to the positioning plane of the plate itself. Therefore, for each plate 20, 20', 20", the corresponding elements 5, 5', 5" associated therewith are arranged in a row along a direction orthogonal to the plane on which said reciprocally opposite peripheral walls develop.

For the purposes of the present invention, the word "plate" thus indicates a substantially two-dimensional body with two main sides which develop on parallel planes along a transversal direction 400 and a longitudinal direction 401 having a thickness S (evaluated as the distance between such parallel planes) which is negligible with respect to the extension.

With reference to FIGS. 3 and 13, each of the plates 20, 20', 20" is preferably defined so that the peripheral frame comprises a first transversal portion 21, a second transversal portion 22 opposite and parallel to the first transversal portion 21, a first longitudinal portion 31 perpendicular to the transversal portions 21, 22 and a second longitudinal portion 32 opposite to the first longitudinal portion 32. For each plate 20, 20', 20" the transversal portions 21, 22 are thus developed parallel to the transversal direction of development 400 of the plate, while the longitudinal portions 31, 32 develop parallel to the longitudinal direction 401.

The elements 5, 5', 5" are defined between the transversal portions 21 and 22 and oriented so that their main direction of development 500 is parallel to the longitudinal direction of development 401 of the corresponding plate 20, 20', 20" with which they are associated. In essence, such elements 5, 5', 5" develop parallel as a plurality of central longitudinal portions parallel to one another and at the same time parallel to the longitudinal portions 31, 32 of the peripheral frame. For this reason, hereinafter these central longitudinal portions of the plates 20, 20', 20" will be indicated using the same reference numerals 5, 5', 5" already used to indicate the elements made of translucent material.

According to the objects of the present invention, the longitudinal central portions 5, 5', 5" of each plate 20, 20', 20" are thus intended to remain incorporated within the semi-finished product 2 after the pouring and the subsequent hardening of the cementitious mortar. As described in greater detail below, the peripheral frame (formed by the transversal portions 21, 22 and by the longitudinal portions 31, 32) of each plate 20, 20', 20" is instead intended to be eliminated from the semi-finished cementitious mortar product 2 after the hardening and before proceeding with the transversal cutting (sectioning) of the above-described semi-finished product 2.

The plates 20, 20', 20" are adapted to be rigidly restrained to two opposite peripheral walls (e.g. a first wall 41 and a second wall 42 or third wall 43 and fourth wall 44) and to the lower wall 45 of formwork 4. This allows the longitudinal portions 5, 5', 5" of the plates 20, 20', 20" to maintain a stable position during the pouring of the cementitious mortar in formwork 4.

According to a preferred embodiment, the constraint of the plates 20, 20', 20" to the walls of formwork 4 is preferably made by predefining a plurality of guides inside the container 4, each of which for the positioning of a corresponding plate 20, 20', 20" according to a plane orthogonal to two opposite walls of the container (hereinafter the first wall 41 and the second wall 42 for the sake of simplicity of description only).

For example, with reference two FIGS. 1 and 5, each of said guides preferably comprises a first rectilinear groove 51 defined on an inner side 41' of the first wall 41, a second rectilinear groove 52 defined on the inner side 42' of the second wall 42 and a third groove 53 defined on the inner side of the inner wall 45 of the container 4. For each guide, the first groove 51 develops in position facing the second groove 52, while the third groove 53 is aligned with the first groove 51 and the second groove 52 so that the guide as a whole is shaped as a three-position "continuous inner groove" which indeed defines a positioning plane for a corresponding plate 20, 20', 20". In this regard, each plate 20', 20', 20" may be easily inserted in guillotine-like manner into the container 4 indeed by utilizing each continuous inner groove. The depth of the grooves 51, 52, 53 is preferably chosen to be equal to at least 1.5 times the thickness S of the plates 20, 20', 20", while the extension of the grooves 51, 52, 53 themselves may be chosen so as to be barely sufficient to achieve the fitting in order to prevent fine cementitious mortar aggregates from being inserted between the regions of the plates 20, 20', 20", inserted in the grooves themselves, and the continuous edge of the grooves themselves.

For the purpose of conferring a broader flexibility to the method of manufacturing of the panels 1, it may be preferable to define said grooves 51, 52, 53 on interchangeable flat bodies (not shown), made, for example, of PVC, which are fixed internally to the peripheral walls intended to support the plates 20, 20', 20" and to the lower wall 45 of formwork 4 each time. In essence, in this assumption, the grooves 51, 52, 53 are not defined directly on the inner walls of formwork 4, but on removable flat bodies applicable to the walls themselves. In this manner, the same formwork 4 can be used to obtain a different spacing between the flat bodies 20, 20', 20" without needing to replace/redefine the peripheral walls 41, 42, 43, 44 and the lower wall 45 of formwork 4 whenever one chooses to change the aforesaid spacing.

For each inner guide, the corresponding grooves 51, 52, 53 are adapted to contain an edge of a portion 31, 32, 22 of the peripheral frame of a corresponding plate 20', 20', 20". More in detail, and with reference to FIGS. 2 and 3, it is worth noting that for each plate 20, 20', 20", the edge 31' of the first longitudinal portion 31 and the edge 32' of the second longitudinal portion 32' of the peripheral frame are inserted in the first groove 51 and in the second groove 52 of the corresponding inner guide, respectively. Furthermore, for each plate 20, 20', 20" the edge 22' of the second transversal portion 22 of the peripheral frame is inserted in the third groove 53 of the corresponding inner guide.

It is apparent that this solution makes positioning the plates 20, 20', 20", i.e. the positioning of the elements 5, 5', 5" made of translucent material associated with the plates themselves in formwork 4 particularly fast and easy. Furthermore, as indicated above, the use of the inner guides ensures a stable, precise positioning to the plates 20, 20', 20" during the step of pouring the cementitious mortar in formwork 4. In essence, the problems of linearity and parallelism which accompanied the traditional manufacturing methods are completely solved.

With reference to FIG. 3, it is worth noting that each plate 20, 20', 20" preferably defines a first opening 36' defined between the first longitudinal portion 31 of the peripheral frame and a first longitudinal portion 5' i.e. a first element 5') and a second opening 36" defined between the second longitudinal portion 32 of the peripheral frame and a second longitudinal portion 5" opposite to the first with respect to the transversal direction 400 which respect to which the longitudinal portions 5, 5', 5" are arranged side by side. Intermediate openings 35 are instead defined between the central longitudinal portions 5, 5', 5".

It is worth noting that the first opening 36', the second opening 36" and the intermediate openings 35 have the same longitudinal extension (indicated in FIG. 3 with reference 91), but a different transversal extension. Indeed, the first opening 36' has a smaller transversal extension (indicated by reference numeral 92) than the second opening 36" (indicated by reference numeral 93). The intermediate openings 35 have the same transversal extension 94 which is however different from the transversal extension 91 of the first opening 36' and from the extension 93 of the second opening 36". This particular relationship between the transversal extensions 92, 93, 94 of the openings 35, 36', 36" of each plate 20, 20', 20" allows to obtain a particular arrangement of the elements 5, 5', 5" inside formwork 4 as specified in greater detail below. In this regard, it is worth noting that the above-described relationship between the extensions 92, 93, 94 of the openings 35, 36', 36" is advantageously followed also in the case in which the overall extension of the plates 20, 20', 20" along the transversal direction 400 is considerably greater than that along the longitudinal direction 401 as shown in the embodiment in FIG. from 11 to 13.

Each positioning plate 20, 20', 20" may be made of translucent polymeric material, preferably PMMA, but alternatively also glass. In particular, the central longitudinal portions 5, 5', 5" of each plate 20, 20', 20" may be advantageously defined by means of a cutting operation after which portions of material corresponding to the openings 35, 36', 36" provided in the plate itself are removed. It is worth noting that such a cutting operation may be advantageously performed, for example, using automatic equipment, e.g. a laser cutting machine in the case of PMMA, or with a high-pressure water jet in the case of glass. In fact, the production of such plates 20, 20', 20" may be easily industrialized with a considerably decrease of production costs with respect to the above-described methods based on the use of chain-shaped elements. This by virtue of the reduction of the cutting length but also by virtue of the drastic reduction of the straight angles. Indeed, for the chain elements known from the prior art, the laser cutting head/pressurized water must necessarily slow down, stop and resume the motion in orthogonal direction with consequent increase of machine times. On the contrary, the manufacturing of the plates 20, 20', 20" is evidently much easier. Finally, it is worth noting that the use of glass as a material for making the plates is allowed by virtue of the structure of the plates themselves which are more rigid, and thus less subject to fracture than the chain-shaped elements.

With reference to FIGS. 1 and 4, once formwork 4 is assembled and once the plates 20, 20', 20" are defined, each one is inserted through a corresponding inner guide in formwork 4. In particular, each plate 20, 20', 20" is preferably inserted to assume a position turned by 180 degrees about an axis parallel to the longitudinal axis, with respect to the two plates adjacent to it. This particular insertion method is shown with reference to FIG. 4, in which it can be noted that the central plate 20 is turned with respect to the two adjacent plates 20', 20", which are instead oriented in the same manner. It is worth noting that at the end of the insertion of the three plates 20, 20', 20", the first longitudinal portion 31 and the second longitudinal portion 32 of the peripheral frame of the central plate 20 face the second longitudinal portion 32 and the first longitudinal portion 32 of the peripheral frame of the two adjacent plates 20', 20", respectively. Furthermore, the central longitudinal portions 5, 5', 5" defined by the central plate 20 face corresponding openings 35, 36', 36" of the other adjacent plates 20', 20".

This particular insertion method of the plates 20, 20', 20" substantially translates into an offset arrangement of the central longitudinal portions 5, 5, 5" of adjacent plates. More specifically, the central longitudinal portions 5, 5, 5" are offset with respect to that of the adjacent plates 20', 20" along a direction orthogonal to the first wall 41 and to the second wall 42 of formwork 4.

With reference to FIGS. 5 and 6, according to a possible embodiment, at the end of the positioning of the second flat plates 20, 20', 20" a reinforcement structure is arranged inside the container 4 in order to increase the mechanical resistance of the panels 1 which will be obtained following the step of cutting the semi-finished product 2. Such a reinforcement structure may be of the distributed type (e.g. mesh-shaped) or localized (e.g. comprising cylindrical parts of relatively small diameter connected to each other).

In this regard, FIGS. 5 and 6 show, by way of example, a reinforcement structure of the distributed type formed by a reinforcing mesh of the type normally used in constructions to support plaster cementitious mortar on walls. With reference specifically to FIG. 5, the mesh comprises a first portion 61 and a second portion 62 parallel to the first wall 41 and to the second peripheral wall 42, respectively. The mesh 60 further comprises a third portion 63 and a fourth portion 64 parallel to the third wall 43 and to the fourth wall 44 of the container 4, respectively. The first portion 61 and the second portion 62 of the mesh 60 are arranged through a first side passage 81 and through a second side passage 82 defined by the side openings 36', 36" of the plates 20, 20', 20" once they are assembled. More specifically, the first portion 61 and the second portion 62 are arranged in position substantially adjacent to the inner edges 31", 32" of the longitudinal portions 31,32 of the plates 20, 20', 20". Such an arrangement may be observed in FIG. 6 which shows only the plates closest to the third wall 43 and to the fourth wall 44 of formwork 4 in order to disclose the method with which the portions 61, 62 of mesh 60 cross the passages 81, 82 defined by the overlap of the side openings 36', 36" of the plates 20, 20', 20".

The third portion 63 of the mesh 60 and the fourth portion of the mesh 64 are arranged in a position adjacent to the third wall 43 and in a position adjacent to the fourth wall 44 of formwork 4, respectively. As mentioned above, such walls 43, 44 are indeed orthogonal to the first wall 41 and to the second wall 43. As shown in FIG. 6, it is worth noting that the third portion 63 and the fourth portion 64 of the mesh 60 are connected to the first portion 61 and to the second portion 62 so as to confer a closed loop configuration to the mesh 60.

With reference again to FIG. 5, the peripheral mesh 60 comprises two preferably "L"-shaped parts, each of which defines one of the longitudinal portions (either the first portion 61 or the second portion 62) and one of the transversal portions (either the third portion 63 or the fourth portion 64) of the same peripheral mesh. In FIG. 5, for example, a first L-shaped part 60' defines the first portion 61 and the fourth portion 64 and a second L-shaped part 60" defines the second portion 62 and the third portion 63. The first portion 61 of the first L-shaped part 60' and the second portion 62 of the second L-shaped part 60" are inserted in the corresponding passage 81, 82 so as to be arranged in front of the first wall 41 and the second wall 42 of the container. At the end of their positioning, the first portion 61 of the first L-shaped part 60' is connected to the third portion 63 of the second L-shaped part 60' by welding or metallic binding. Similarly, the second portion 62 of the second L-shaped part 60" is connected to the fourth portion 64 of the first L-shaped part 60' so as to complete the peripheral structure of the mesh 60. As described and shown, it is apparent that the position of the mesh formed by the two L-shaped parts 60', 60" is easy to be implemented. At the end of the step of pouring, the mesh is also obviously incorporated in the semi-finished cementitious mortar product 2. It is worth observing that the above-described mesh 60 is positioned before completing the structure of formwork 4.

The main effect of the above-described reinforcement structure (i.e. based on the use of a plaster reinforcing mesh) is to prevent micro cracking (hair cracks) which could appear along the edges of the panels which are obtained at the end of the method of manufacturing according to the invention. In this regard, it is worth noting that the thickness of each panel 1 must be preferably defined so as to contain at least 2-3 mesh links in order to improve the diffusive effect of shrinking or thermal stresses.

If panels 1 of considerable extension are needed (e.g. in which the flat sides 1', 1" having an extension 1×3 meters), it may be useful to use a "cage"-like reinforcement structure, i.e. one formed by localized development elements (e.g. cylindrical bars) appropriately dimensioned so as to be inserted through passages 81, 82 defined through the reinforcement plates 20, 20', 20" according to methods which are conceptually similar to those described above for the reinforcing mesh. Such a "cage"-like structure could comprise, by way of example, a series of parallel U-shaped brackets obtained by bending cylindrical bars of relatively small size. Such brackets could be spaced apart and bound to orthogonal uprights with respect to the lower wall 45 which defines the resting surface 105 of formwork 4. In this assumption, such uprights must be made of a material which may be easily cut during the step of cutting the semi-finished product 2 from which the panels 1 are obtained.

In general, above all in the case of exterior applications, the reinforcing mesh or the indicated cage-like structure may be made of stainless steel in order to prevent the surfacing of corrosion products on the panel surface. However, the provision of a reinforcement structure is only one of the possibilities and is thus a non-exclusive variant embodiment of the method according to the invention. In fact, the use of any reinforcement structure may be evaluated according to the specific reference application, e.g. according to the material chosen for the elements 5, 5', 5" made of translucent material and/or the exposure/use required for the panel. FIG. 7 diagrammatically shows the step of pouring the cementitious mortar which is carried out at the end of the positioning of the plates 20, 20', 20" in formwork 4 and possibly the positioning of a reinforcement structure. In particular, the cementitious mortar is poured into formwork 4 preferably to a level corresponding to the upper edge of the plates 20, 20', 20' or however to a height such that the longitudinal central portions 5', 5', 5" of the plates 20, 20', 20' are completely submerged in the cementitious mortar. The cementitious mortar used must have high fluidity and low viscosity to prevent incorporating air in the openings 35, 36', 36" of the plates 20, 20', 20" and to allow a perfect distribution between the plates and possibly through the caps of the peripheral mesh 60 if it is present. In addition to these properties, the cementitious mortar should preferably also have a low hydration heat and a low hydraulic shrinkage.

With reference to FIG. 8, following the hardening of the cementitious mortar, a semi-finished cementitious mortar product 2 is extracted by disassembling the container 4. In other words, the four peripheral walls 41, 42, 43, 44 and the bottom wall 45 are separated from one another.

After extraction, the semi-finished cementitious mortar product 2 undergoes a step preliminary to the step of cutting which leads to the formation of the panels 1. The purpose of such a squaring operation is to eliminate some parts in excess of the extracted semi-finished cementitious mortar product 2 which are intended to be part of the desired panels 1. Such parts in excess comprise first and foremost the regions of the semi-finished product 2 which incorporate the portions of the peripheral frame of the plates 20, 20', 20". In essence, the semi-finished product 2 is squared so as to display a transversal extension corresponding to the distance (indicated by reference 96 in FIG. 9) between the inner edges 31", 32" of the longitudinal portions 36', 36" of each plate 20, 20', 20" and a longitudinal extension corresponding to the length (indicated by reference 96' in FIG. 9) of the central longitudinal portions 5, 5', 5". Some cutting planes are substantially shown in FIG. 9 (indicated by reference numerals A, B, C and D) according to which the squaring of the semi-finished product 2 is obtained. It is worth noting that in FIG. 9 the dashed lines indicate the central longitudinal portions 5, 5', 5" of a plate which are indeed incorporated inside the semi-finished product 2.

With reference to FIG. 10, at the end of the step of squaring, the semi-finished product 2 has a first main surface 2' and a second main surface 2" parallel to each other and orthogonal to the main direction of development 500 of the elements 5, 5', 5" made of translucent material (i.e. the longitudinal portions of the plates 20, 20', 20") incorporated in the semi-finished product itself. Following the squaring, the method according to the invention thus includes transversally sectioning/cutting the semi-finished product 2 into prismatic portions each corresponding to a desired panel 1. As indicated above, the sectioning of the semi-finished product 2 occurs along transversal section planes which are orthogonal to the reference direction 303 of the semi-finished product 2, i.e. orthogonal to the main direction of development 500 of the elements 5, 5', 5" made of translucent material incorporated in the semi-finished product itself.

According to a possible embodiment, the cutting of the squared semi-finished product 2 may be made so as to obtain various panels 1 in sequence. This means that the panels 1 may be obtained by means of a series of operations substantially equivalent to the number of panels 1 to be obtained. According to an alternative, preferred embodiment (diagrammatically shown in FIG. 10), the panels 1 may be advantageously obtained by means of cutting machines comprising a plurality of cutting tools 700 (e.g. grinding wheels made of appropriate material) which simultaneously cut the previously squared semi-finished product 2. In this manner, the panels 1 may be advantageously obtained by means of a single cutting operation carried out by a plurality of cutting tools which cut the panels 1 simultaneously. This obviously translates into a considerable saving of manufacturing time and costs.

If the semi-finished product 2 also incorporates a reinforcement structure as described above, then each panel 1 obtained following the transversal cutting of the semi-finished product itself comprises a portion of the reinforcement structure 60 itself. For example, a corresponding region deriving from one of the portions 61, 62, 63, 64 of the mesh itself is present in a position adjacent to each peripheral side 2', 2", 3', 3" of panel 1 if a reinforcing mesh 60 is used.

As described above, FIGS. from 11 to 13, show a possible embodiment of the method according to the invention to obtain panels 1 the main sides 1', 1" of which have a substantially rectangular shape shown in FIG. 12. FIG. 11 shows the structure of formwork 4 and of the plates 20, 20', 20" used in the second embodiment, while FIG. 13 is a front view of such plates.

According to a general aspect of the method valid for both embodiments shown, formwork 4 has a height (i.e. an extension along a third vertical direction 203) equal to the sum of the thicknesses of panels 1 to be made and a total thickness which is given by the sum of the thickness of material which is removed during the squaring process of the semi-finished product 2 and the subsequent step of cutting implemented to obtain the aforesaid panels. In particular, with reference to the indications shown in FIG. 13, such a height can be defined by the following formula:

$$H=(h_1+h_2+h_3+ \ldots +h_{Np})+(N_p-1)*s_t+S_{22}+S_{21}$$

where:
H=is the height of formwork 4 (indicated in FIG. 11) measured in vertical direction 203 parallel to the cementitious mortar pouring direction net of the thickness of the lower wall 45 of the formwork itself;
$h_1, h_2, \ldots, h_i, \ldots, h_{Np}$=are the relative thicknesses/heights of the Np panels to be obtained by means of the method according to the invention; in this regard, in the examples shown, the obtained panels have the same thickness (indicated by Hp), but they could obviously have different values by virtue of a different adjustment of the cutting distance;
$S_t$=thickness of the material removed during the cutting process (approximately coinciding with the thickness of the cutting tool—grinding wheel—plus the relative thickness of the possible smoothing) following the squaring of the semi-finished product 2;
$S_{22}$, $S_{21}$=thicknesses evaluated along the longitudinal direction 401 of the plates 20, 20', 20", of the parts in excess of the semi-finished product 2 which are eliminated during the squaring of the semi-finished product itself (with reference to FIG. 13 and to that indicated above with regards to FIG. 8); such thicknesses include the cutting and possible grinding thicknesses of the lower face of the first panel starting from the bottom of formwork 4 and of the upper face of the last panel (Np-th panel).

The peripheral regions (indicated by reference numeral 8) corresponding to the edges 31', 32', 22' of the plate 20, 20', 20" intended to be fitted into the grooves 51, 52, 53 defined at the three wheels 41,42,45 of formwork 4 according to the above-described principles are shown in FIG. 13 for the sake of completeness. In FIGS. 10 and 12, references $B_p$ and $L_p$ indicate the width and the length of a panel 1 obtained by means of the method according to the invention respectively, while Hp indicates the height of the panel itself measured as the distance between its main flat sides 1', 1". If these dimensions (length and width) are different, hereinafter "width" means the smaller dimension.

In general, for the method according to the invention the following ratio generally exists:

$$L_p=k*B_p$$

where k is a number higher than 1. In the case of the panels shown in FIG. 11, the value of k is equal to 2, because the length $L_p$ is substantially double the width $B_p$. In the case shown in FIG. 10, instead, k may be considered equal to 1 because the width $B_p$ substantially coincides with the length $L_p$.

It is worth noting that as a function of the orientation of the plates 20, 20', 20" in formwork 4 and following the cutting process (which specifically occurs according to planes orthogonal to the longitudinal direction 500 of the elements 5, 5', 5") the through portions 55 of the panels may be oriented parallelly to the width $B_p$ of the panel or alternatively to the length $L_p$. In the case in FIG. 12, for example, the through portions 55 are oriented for example parallel to the width $B_p$.

With reference to the step of pouring into formwork 4, following the arrangement of the plates 20, 20', 20", it is worth noting that it is preferable not to exceed 75° C. in the poured mass in order to reduce the risk of delayed ettringite formation (DEF). However, the cementitious mortar must have high pouring properties to allow an excellent filling of formwork 4.

Furthermore, it has been observed that in order to make the method according to the invention particularly reliable the size of the plates 20, 20', 20" used should preferably be defined/chosen also in relation to the composition of the cementitious mortar and in particular to the maximum diameter (indicated by $\phi_{max}$) of the aggregate of the cementitious mortar itself. In this sense, with reference again to FIG. 13, the following dimensions are defined:
$H_{net}$: height of a plate 20, 20', 20" made of translucent material;
$L_{t,j}$: width measured along the transversal direction 400 of the j-th translucent element 5, 5',5" associated with the plate 20, 20', 20";

$L_{m,j}$: width measured along the transversal direction 400, of the j-th central opening of the plate 20, 20', 20" defined by two corresponding elements 5, 5', 5" associated with the plate itself;

$B_p$, $L_p$: width ($B_p$) i.e. length ($L_p$) of panel 1;

$L_i$: extension of the plate measured according to the transversal direction 400 of development of the plate itself;

n: total number of elements 5, 5',5" associated with a plate 20, 20', 20"

It has been seen that in order to optimize the method according to the invention the width of the j-th central opening of the plates 20, 20', 20" made of translucent material should preferably satisfy the condition: $(L_{m,j})>3$ ($\phi_{max}$). It has been seen that the following formula should preferably also be satisfied:

$$Bp, Lp = L31 + L32 + \sum_{j=1}^{n} Lt, j + \sum_{j=1}^{n-1} Lm, j$$

where the two dimensions $L_{31}$ and $L_{32}$ are the widths, measured along the transversal direction 400, of the longitudinal portions 31,32 of the plate 20, 20', 20"

Furthermore, it has been observed that in order to define a suitable passage of the cementitious mortar between the two adjacent plates 20, 20', 20" the distance between the plates themselves should preferably be at least three times the maximum diameter $\phi_{max}$ of the aggregate.

The thickness value of the plates 20, 20', 20" may vary from 3 to 10 mm, typically from 3 to 6 mm if PMMA is chosen as the material for the plates 20, 20', 20'. If glass is used, the minimum thickness provided for the plates 20, 20', 20' is preferably 4 mm. Finally, the width $L_{t,j}$ of the translucent element 5, 5',5" preferably varies from 5 (20 in the case of glass) to 100 mm.

From the above, it is apparent that the method according to the present invention completely allows to fulfill the predetermined tasks and objects. In particular, the method according to the invention allows first and foremost to drastically reduce the production costs mainly by simplifying the steps of the method and to cut the time needed to define the translucent elements (plates 20, 20', 20"). The method according to the invention further allows to considerably improve the positioning accuracy (parallelism and rectilinearity) of the elements 5, 5', 5" made of translucent material inside formwork 4 and during the step of pouring so as to limit the production scrap.

Another extremely advantageous aspect is found in the high production flexibility. Indeed, by means of the method it is possible to make panels of different thickness without needing to change or modify the structure of the employed formwork 4. Furthermore, the method allows to use glass as the material for the elements 5, 5', 5". The use of glass in alternative to PMMA allows to improve the thermal compatibility between cementitious mortar matrix and the elements themselves and provides a suitable protection from alkaline attack.

Finally, the method also allows to manufacture panels characterized by rigorously flat, parallel surfaces which facilitate alignment during the step of installation. This aspect is a major critical issue of the methods of the traditional art.

The invention claimed is:

1. A method for manufacturing prism-shaped panels, each comprising through portions made of translucent material adapted to transmit light between two opposite sides of the panel, said method comprising the steps of:

arranging a prism-shaped formwork which is developed along a first horizontal direction, a second horizontal direction orthogonal to the first direction and along a third essentially vertical direction;

arranging a plurality of elements made of translucent material which is developed mainly along a longitudinal direction of development;

arranging said elements within said formwork according to a predetermined arrangement corresponding to that provided for said through portions in said panels, said elements being arranged so that said longitudinal direction of development is parallel to said third direction in which said formwork is developed;

pouring cementitious mortar into said formwork so that said cementitious mortar is distributed between said elements and so as to generate, after the hardening of said cementitious mortar, an essentially prism-shaped semi-finished cementitious mortar product in which said elements made of translucent material are incorporated;

extracting said semi-finished product from said formwork after the hardening of said cementitious mortar;

cutting said semi-finished product according to cutting planes orthogonal to the longitudinal direction in which said elements incorporated in said semi-finished product develop, so as to obtain prism-shaped parts, each of which corresponds to one of said panels, wherein said elements made of translucent material are arranged in separate groups, each of which is associated with a positioning plate, each plate comprising an essentially two-dimensional body which defines a peripheral frame which supports a group of said elements, and wherein said method includes arranging each plate in said formwork so that said elements are positioned on a plane orthogonal to two reciprocally opposite containing walls.

2. A method according to claim 1, wherein said formwork comprises a first containing wall, a second containing wall parallel and opposite to said first wall, a third containing wall and a forth containing wall parallel and opposite to each other, said third wall and said fourth wall being orthogonal to said first wall and to said second wall, said container comprising a lower containing wall on which said containing walls rest, said containing walls being connected by removable connection means to allow to disassemble said formwork.

3. A method according to claim 1, wherein for each plate, said essentially two-dimensional body develops mainly along a transversal direction and along a longitudinal direction, and wherein said peripheral frame comprises:

a first transversal portion and a second transversal portion opposite to said first transversal portion, said transversal portions developing parallel to said transversal direction;

a first longitudinal portion and a second longitudinal portion opposite to each other and orthogonal to said transversal portions, said longitudinal portions developing parallel to said longitudinal direction, and wherein said elements made of translucent material develop as central longitudinal portions comprised between said first portion and said second longitudinal portion, said central longitudinal portions being separated by central openings.

4. A method according to claim 1, wherein each plate is rigidly restrained to two containing walls of said formwork reciprocally opposite and two said lower wall so that said elements maintain a stable position during the pouring of said cementitious mortar.

5. A method according to claim 4, wherein said plates are restrained to said walls of said formwork by means of a plurality of inner guides defined on the inside of said formwork.

6. A method according to claim 4, wherein each of said guides comprises a first rectilinear groove defined on the inner side of said first containing wall, a second rectilinear groove defined on the inner side of said second containing wall in position facing said first groove and a third groove defined on said lower wall in position aligned with said first groove and said second groove, each of said grooves being adapted to contain a corresponding edge of a portion of said peripheral frame of a corresponding plate.

7. A method according to claim 6, wherein each of said guides comprises a first groove and a second groove defined respectively on a first interchangeable flat body applied onto the inner side of said first containing wall and on a second interchangeable flat body applied on the inner side of said second containing wall.

8. A method according to claim 3, wherein each of said plates defines:
- a first lateral opening between said first longitudinal portion of said peripheral frame and a first central longitudinal portion;
- a second lateral opening defined between said second longitudinal portion of said peripheral frame and a second central longitudinal portion opposite to said first central longitudinal portion; and wherein the extension of said first lateral opening is different from the transversal extension of said second lateral opening and wherein
- said plates are arranged within said formwork so that for each one said first side opening and said second side opening face the second side opening and the first side opening of an adjacent plate, respectively.

9. A method according to claim 3, wherein said central openings have an extension three times larger than the maximum diameter of the aggregate contained in said cementitious mortar measured along said transversal direction.

10. A method according to claim 1, wherein said peripheral frame and said elements made of translucent material are made in one piece of a translucent material corresponding to that provided for said elements.

11. A method according to claim 10, wherein said plates are made of PMMA or glass.

12. A method according to claim 11, wherein said plates are made by laser cutting if they are made of PMMA and wherein said plates are made by means of a high pressure water jet if they are made of glass.

13. A method according to claim 1, wherein said positioning plates are arranged within said formwork so that for each plate the elements made of translucent material associated therewith assume an offset position with respect to the position of the elements corresponding to an adjacent plate.

14. A method according to claim 1, wherein said method comprises the step of arranging a reinforcement structure in said formwork before pouring said cementitious mortar.

15. A method according to claim 14, wherein said reinforcement structure comprises a reinforcing mesh arranged so that a first portion and a second portion of said mesh are parallel to a said first wall and to said second wall of said formwork, respectively, and so that a third portion and a fourth portion of said mesh are parallel to said third wall and to said fourth wall of said formwork, respectively.

16. A method according to claim 1, wherein said method comprises the step of squaring of said semi-finished product after having extracted the semi-finished product from said formwork, said squaring operation comprising cutting operations of said semi-finished product so as to eliminate the parts of said peripheral frame of said plates so that only the longitudinal portions of said positioning plates corresponding to said elements made of translucent plastic material remain incorporated in said semi-finished product.

17. A method according to claim 1, wherein said method comprises the step of cutting said semi-finished product according to transversal planes by means of a cutting machine comprising a plurality of cutting tools which work simultaneously on said semi-finished product so as to simultaneously define a plurality of prismatic parts corresponding to a plurality of panels.

* * * * *